US00RE34030E

United States Patent [19]

Scherer

[11] E Patent Number: Re. 34,030

[45] Reissued Date of Patent: Aug. 18, 1992

[54] INTEGRATED CASCADE REFRIGERATION SYSTEM

[75] Inventor: John S. Scherer, Santa Monica, Calif.

[73] Assignee: Frank J. Scherer, Riverside, Calif.

[21] Appl. No.: 682,587

[22] Filed: Apr. 8, 1991

Related U.S. Patent Documents

Reissue of:

[64] Patent No.: 4,819,445
Issued: Apr. 11, 1989
Appl. No.: 36,711
Filed: Apr. 9, 1987

[51] Int. Cl.[5] ..... F25B 27/02

[52] U.S. Cl. ..... 62/238.3; 62/323.2; 62/332

[58] Field of Search ..... 62/238.3, 323.1, 323.2, 62/332, 335

[56] References Cited

U.S. PATENT DOCUMENTS

| | | | |
|---|---|---|---|
| 2,260,477 | 10/1941 | Newton | 62/323.1 |
| 2,274,152 | 2/1942 | McGrath | 62/323.1 |
| 2,385,033 | 9/1945 | Schwarz | 62/323.1 |
| 2,388,210 | 10/1945 | Hanson et al. | 62/323.1 |
| 3,015,940 | 1/1962 | Harwich | 62/335 |
| 3,401,530 | 9/1968 | Meckler | 62/323.1 |
| 3,824,804 | 7/1974 | Sandmark | 62/335 |
| 3,953,983 | 5/1976 | Sander | 62/335 |
| 4,031,712 | 6/1977 | Costello | 62/483 |
| 4,285,211 | 8/1981 | Clark | 62/335 |
| 4,335,580 | 6/1982 | Hannett et al. | 62/79 |
| 4,374,468 | 2/1983 | Takeshita et al. | 62/335 |
| 4,380,909 | 4/1983 | Sung | 62/238.3 |
| 4,471,630 | 9/1984 | Sugimoto et al. | 62/335 |
| 4,505,133 | 3/1985 | Malewski et al. | 62/476 |

FOREIGN PATENT DOCUMENTS 953378 11/1956 Fed. Rep. of Germany .

*Primary Examiner*—William E. Tapolcai
*Attorney, Agent, or Firm*—Poms, Smith, Lande & Rose

[57] ABSTRACT

A high efficiency, self-modulating refrigeration system has three principal parts, including (1) a compression refrigeration circuit, (2) an absorption refrigeration circuit coupled in cascade with the compression circuit, and (3) an engine or prime mover/electric generator combination, with the electric generator supplying power to the compressors, pumps, fans and other auxiliary equipment, of the refrigeration circuits, and the waste heat from the prime mover or engine being supplied to the still, or reboilers associated with the absorption refrigeration circuit. Ammonia is used in the absorption circuit, and ammonia or Freon is preferably used in the compression circuit. For retrofitting of compression systems, the existing compression and other equipment may be retained, and employed when servicing or repairing the absorption circuit, or engine generator. Multiple staging may be employed, and the various circuits may be intercoupled from a heat exchange standpoint at several points in the circuits.

32 Claims, 4 Drawing Sheets

FIG. 3
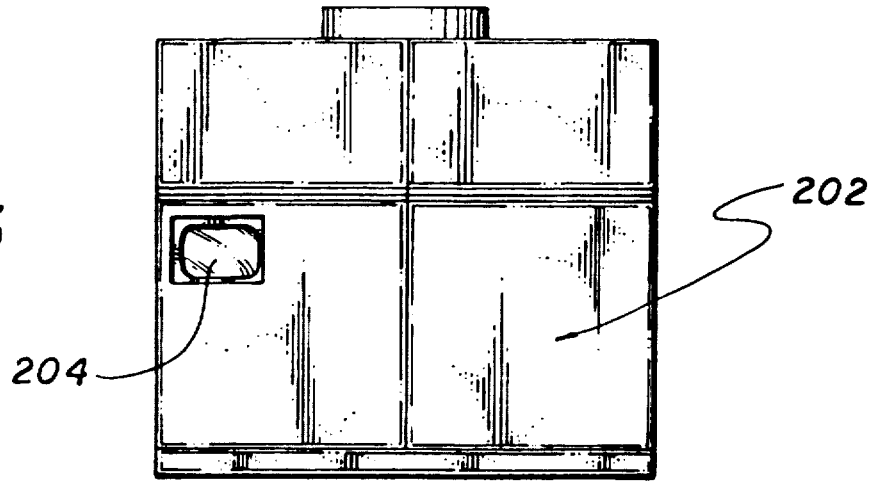
FIG. 4
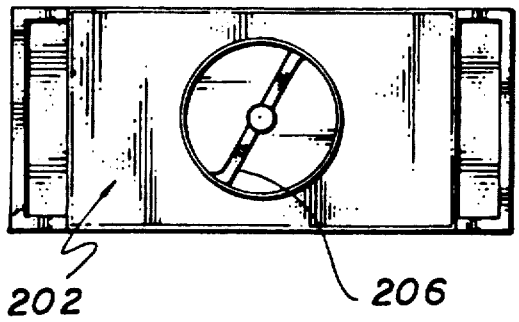
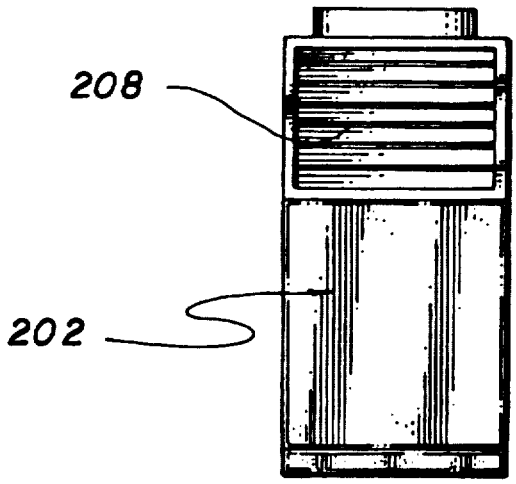
FIG 5

INTEGRATED CASCADE REFRIGERATION SYSTEM

Matter enclosed in heavy brackets [ ] appears in the original patent but forms no part of this reissue specification; matter printed in italics indicates the additions made by reissue.

FIELD OF THE INVENTION

This invention relates to refrigeration circuits.

BACKGROUND OF THE INVENTION

There are two principal types of refrigeration systems generally in use, namely, compression refrigeration systems and absorption refrigeration systems.

The most well-known refrigeration systems are the compression systems used in most home refrigerators and home air-conditioning systems. A refrigerant, such as Freon or ammonia may initially be in the liquid state, under pressure. It is then passed through an expansion valve where it evaporates and becomes a gas with a very substantial drop in temperature. Air is normally blown past coils or pipes through which the evaporating refrigerant is flowing, and the cold air cools the refrigerator or the home. The warmed gas is then routed to an electric compressor, which further heats the gas as it is compressed. The hot compressed gas is then routed to a cooling tower or condenser, where the compressed refrigerant reverts to the liquid state as it is cooled. The cooling cycle is then repeated.

Absorption system refrigeration circuits are somewhat more complicated. They use a refrigerant such as ammonia, and an absorbent, such as water. As in the compression circuit described above, cooling is accomplished when the liquid refrigerant goes through an expansion valve and is permitted to evaporate, with the expected substantial reduction in temperature, and is used for cooling. The vaporized refrigerant, which has now increased in temperature, then flows to an absorber where it is restored to liquid form by being dissolved in the liquid absorbent, such as water, with the substantial generation of heat, normally removed by cooling water or air when water is not available. The liquid solution of absorbent and refrigerant are then raised to a high pressure by a pump, and routed to a still, or other arrangements such as a reboiler and fractionating column combination, wherein external heating is supplied to separate the ammonia (refrigerant) from the water (absorbent). The hot gaseous ammonia at relatively high pressure is then routed to a condenser where it is cooled and liquefied. The cycle is then repeated.

Normally power is supplied from commercial sources to power the pumps or compressors in refrigeration circuits. However, in some systems, such as that disclosed in U.S. Pat. No. 4,335,580, heat from the coolant system of an engine is employed to at least heat the refrigerant when it is functioning in a reverse cycle in the "defrost" mode of the unit. Also, U.S. Pat. No. 4,380,909 discloses the use of heat from engine exhaust gases in an absorbent cycle heat pump system. Also to be noted are prior systems in which a single refrigerant is employed in both compression and absorption refrigeration modes, see U.S. Pat. Nos. 4,505,133, 4,031,712, and 4,285,211.

However, the foregoing systems have significant problems, and substantially lower efficiency than would be desirable. In addition, it is not possible with Freon systems and not practical in most cases to retrofit existing refrigeration systems to conform with ammonia systems with the teachings of the foregoing cited patents.

Accordingly, a principal object of the present invention is to provide an improved refrigeration system which is substantially more efficient then existing systems, and which may be readily retrofitted onto existing systems, whether Freon, ammonia, or other refrigerants are used.

SUMMARY OF THE INVENTION

In accordance with the present invention, it has been recognized that a significant improvement in refrigeration efficiency may be achieved by combining (1) a compression refrigeration circuit, (2) and absorption refrigeration circuit, and (3) a prime mover such as an engine and an electric generator. The refrigerants in the two circuits are preferably kept separate from one another; the heat from the engine generator is employed to vaporize the refrigerant in the absorption cycle, and the evaporation of the refrigerant in the absorption circuit is employed to condense the refrigerant in the compression circuit.

In addition, for example, the absorption circuit may be coupled to the compression circuit at a heat exchanger wherein the hot compressed gaseous refrigerant in the compression cycle is cooled, and the liquid combination of the absorbent and refrigerant is heated, preparatory to separating the refrigerant from the absorbent.

In accordance with a feature of the invention in the absorption circuit, two reboilers may be provided, with the hot exhaust gases from the engine of the engine-generator being directed to a high temperature reboiler, and heated coolant from the engine being directed to a lower temperature reboiler.

In accordance with another aspect of the invention, the new system may be readily retrofitted onto existing compression systems, for example, with the cost of the retrofit equipment being recovered in less than a year, in many cases, through savings in electric charges. The retrofit installation could still include the original compression circuit condenser or cooling unit, so that during repair or modification of the absorption circuit, the compression circuit could operate as a "stand-alone" refrigeration system.

As another aspect of the system of the invention, it could supply electricity to operate additional equipment such as lights or the like, or could supply electricity to the local utility power net.

To further increase efficiency, with a relatively low additional capital investment, the compression of the refrigerant in the compression circuit may be accomplished in two stages, with each circuit refrigerant being cooled by the evaporation of the absorption circuit refrigerant.

An important advantage of the present invention is the self-regulating or self-modulating nature of the system. Thus, if additional cooling is required, the compressor will require more electric power, and the motor generator will run under increased load, and will supply additional heat to the reboilers to process more of the absorption refrigerant; and in turn, the cooling provided by the absorption circuit is increased, and the compression ratio is reduced. Accordingly, the entire system is automatically coordinated to provide a highly efficient cascade refrigeration system even under varying load conditions.

Other objects, features, and advantages of the invention will become apparent from a consideration of the following detailed description and the accompanying drawings.

BRIEF DESCRIPTION OF THE DRAWINGS

FIGS. 3, 4 and 5 are different views of the basic configuration of a retrofit installation suitable for implementing the system of the present invention.

DETAILED DESCRIPTION

Figure 1:
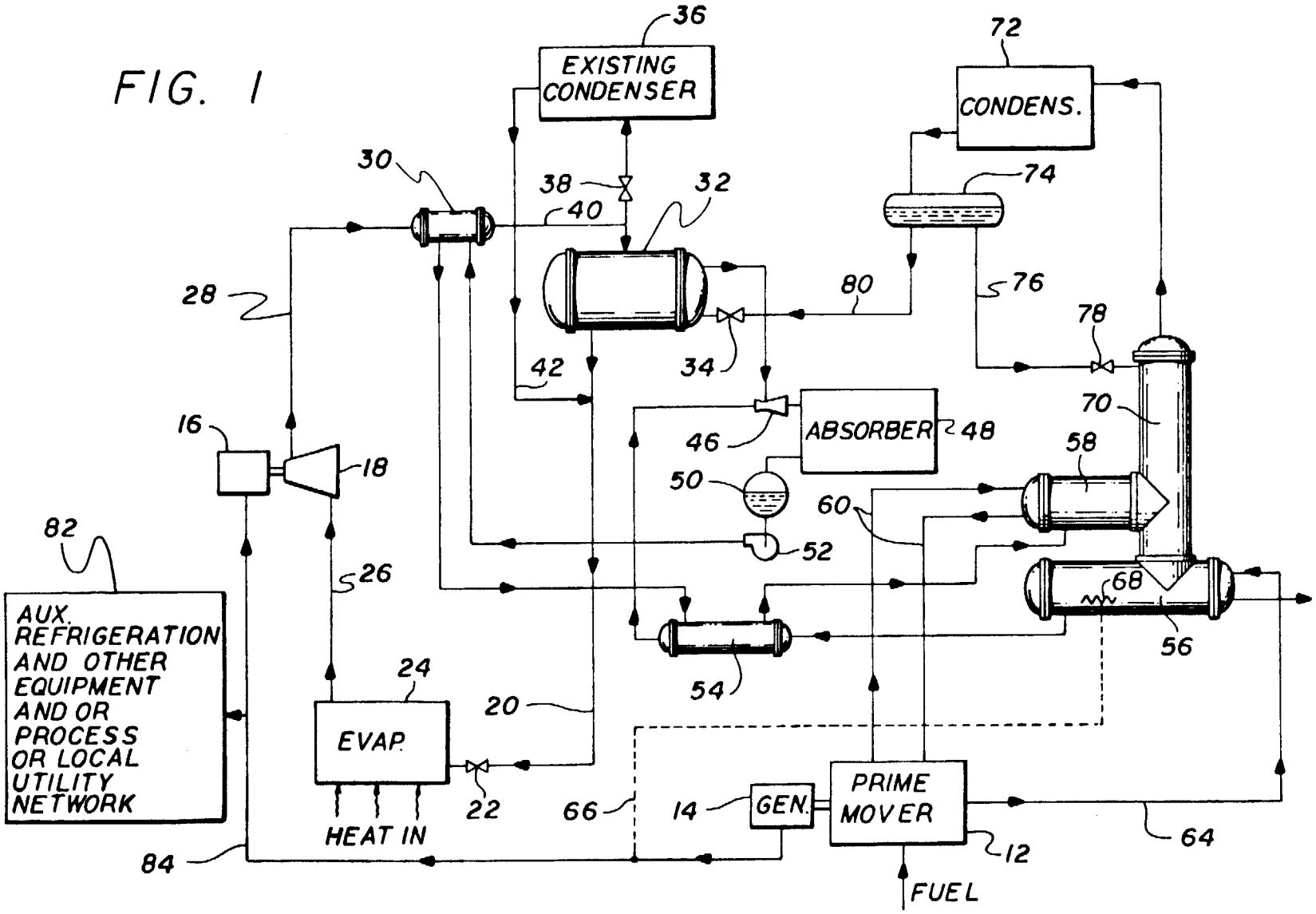
FIG. 1 is a schematic circuit diagram of a cascade refrigeration system illustrating the principles of the present invention.

Referring more particularly to the drawings, FIG. 1 shows a comparatively simple version of the present invention suitable for retrofitting with respect to an existing refrigeration system. More particularly, as shown in FIG. 1, the system includes a prime mover 12, such as an engine or a turbine, and an associated electric generator 14 for supplying power to the pumps and for other functions as described hereinbelow. To the left in FIG. 1 is a compression circuit including the electric motor 16 and the associated compressor 18. Incidentally, the liquid compression refrigerant, which may for example, be Freon, is routed on the line 20 to the expansion valve 22, and the evaporator 24 is the point in the circuit where refrigeration occurs. Thus, the evaporator 24 would be located within a refrigerator or cold storage room. After the gaseous Freon has served its cooling function, and has increased somewhat in temperature, it is routed via line 26 to the compressor 18.

The compressed gaseous refrigerant is then routed along the line 28 to the heat exchanger 30 in which the hot compressed Freon is cooled somewhat, and water having a strong concentration of ammonia, otherwise known as "strong aqua" is heated. The heating of the strong aqua or the concentrated solution of separate ammonia gas from the water, as discussed below.

From the heat exchanger 30, the partially cooled Freon vapor is routed to the exchanger 32 which is the principal coupling link between the compression refrigeration circuit which appears to the left in FIG. 1, and the absorption refrigeration circuit which appears to the right in FIG. 1. More particularly, the unit 32 is the condenser for the compression circuit and is the evaporator for the absorption circuit. Thus, the liquid ammonia is permitted to expand at the expansion valve 34, and in the process of evaporating, cools and condenses the Freon. The unit 32 may include a cylindrical chamber with end caps as shown, and a series of pipes extending through the chamber 32 which are chilled as a result of carrying the ammonia at reduced pressure in the process of evaporating, with the Freon in the space within chamber 32 surrounding the chilled pipes. However, any suitable heat exchange method may be employed. To complete the compression circuit, the liquid Freon is returned to the expansion valve 22 over the line 20.

In the case of retrofit installations, an existing condenser 36 for a stand-alone compression refrigeration system is coupled by valve 38 to line 40 between the heat exchanger 30 and the unit 32. The appropriate valving is installed in line 28 and/or 40 which closes during evaporation defrost and allows high pressure gas to become available for this purpose. In the event of repair or modification of the absorption system which appears to the right in FIG. 1, the valve 38 may be opened and condensed liquid Freon from the condenser 36 may be routed via line 42 to the expansion valve 22. It is understood that suitable valving, not shown in each case, may be provided to make the changeover, either automatically upon appropriate pressure or temperature changes, or manually.

Referring now to the absorption system, it has previously been noted that liquid ammonia is permitted to expand at the expansion valve 34, and it cools and condenses the Freon in the unit 32. The ammonia has been partially warmed as it leaves the unit 32, and is mixed with water and absorbed into the water in the mixer 46 and the absorber 48. The concentrated solution of ammonia, otherwise known in the refrigeration field as "strong aqua", is routed from the absorber 48 to the surge tank 50, and is then pumped by the strong aqua pump 52 to the heat exchanger 30. As mentioned above, the concentrated solution of water and ammonia is heated to some extent in the heat exchanger 30.

It is heated further in the exchanger 54 in which the hot, relatively pure water from reboiler 56 serves to supply the heat. From the heat exchanger 54, the strong aqua is routed to the reboiler 58 where it is further heated by the liquid coolant flowing through the lines 60 from the engine 12. Incidentally, the first reboiler 56 is heated directly by exhaust gases from the engine 12, as indicated by the line 64 at the lower right in FIG. 1. In some cases, the reboiler 56 may require supplemental heating, and this may be accomplished electrically, as indicated by the dashed line 66 and the resistive element 68 shown within the reboiler 56.

The combination of the two reboilers 56 and 58, in combination with the fractionating column 70 serve to separate the gaseous ammonia from water. The ammonia under high pressure is condensed in the unit 72 which is normally subject to either air or circulating water cooling. The reflux retention tank 74 permits the recirculation of a portion of the liquid ammonia through line 76 and the reflux valve 78 to the fractionating column 70. As previously mentioned, the liquid ammonia at high pressure is routed over line 80 to the expansion valve 34.

The block 82 indicates collateral refrigeration or other equipment which may be operated from the electric power supplied on electric circuits 84 from the electric generator 14. Incidentally, if desired, or if convenient from an installation standpoint, the compressors and pumps may be mechanically coupled directly to the prime mover 12; however, normally separate electric motors are provided for driving this collateral equipment including compressors and pumps.

Figure 2:
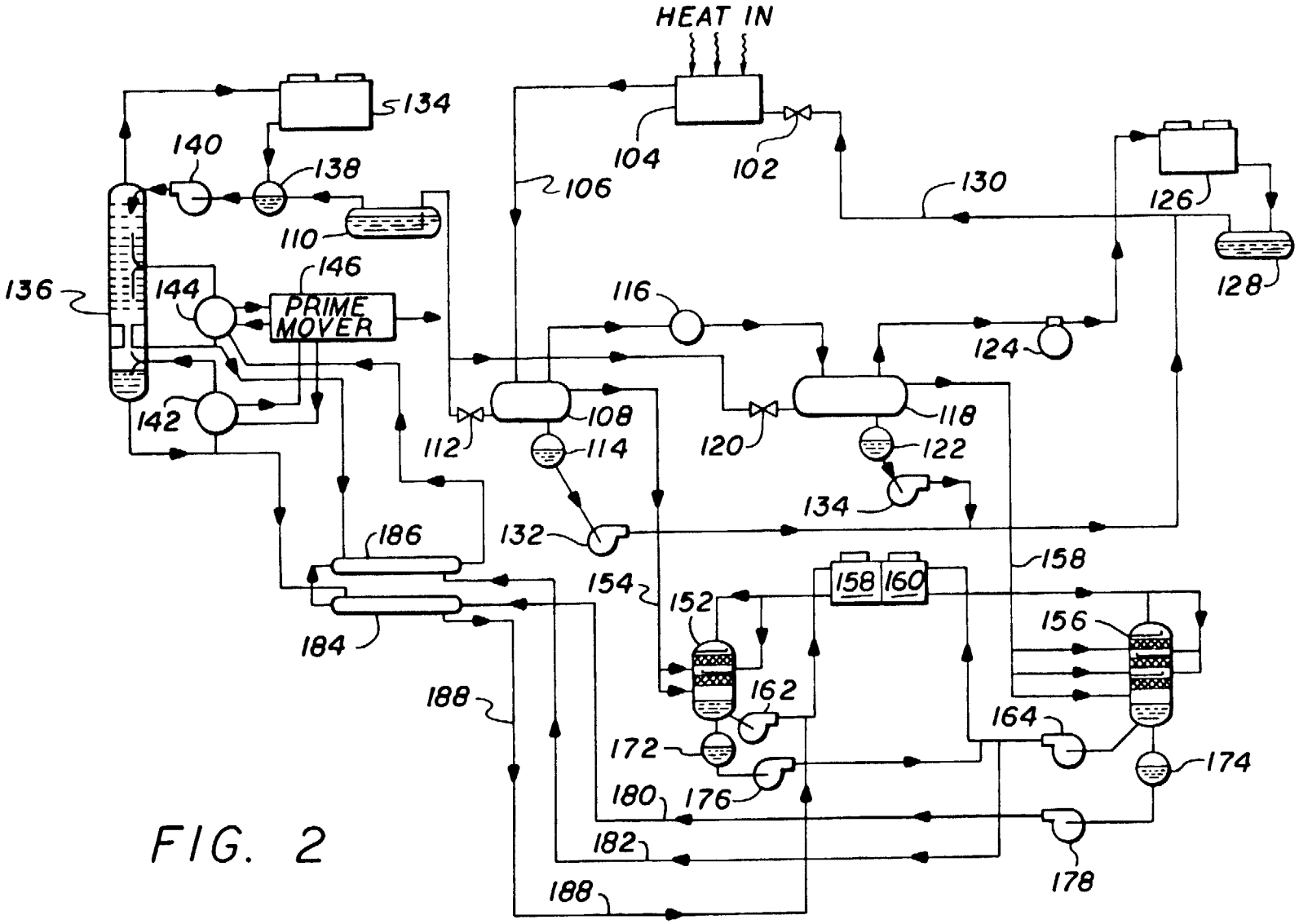
FIG. 2 shows an alternative cascade refrigeration system illustrating the principles of the present invention which is intended for larger installations.

FIG. 2 shows an alternative embodiment of the invention primarily intended for large refrigeration installations. In FIG. 2, the compression circuit is shown mainly toward the top of the figure and to the right, while the absorption refrigeration circuit is shown principally toward the bottom of the figure and to the left. In general, the system of FIG. 2 differs from that of FIG. 1 principally in the multiple staging of the system operation. This increases the efficiency, but is often not economically worthwhile unless substantial size systems are involved.

Referring now to the details of the refrigeration system of FIG. 2, the expansion valve for the compression circuit is located at reference numeral 102, and the compression circuit evaporator 104 is the place where cooling takes place. Thus, the evaporator 104 would be located within the refrigerated storage area which the system is designed to cool.

The somewhat warmed low pressure gaseous refrigerant in line 106 from the evaporator 104 is routed to the heat exchanger 108 which serves much the same function as the unit 32 in FIG. 1. More specifically, the liquid absorption circuit refrigerant from the tank 110 is routed to the expansion valve 112, and the heat exchanger 108 serves to chill the refrigerant from the compressor circuit so that some portion of it condenses and is collected in the tank 114, while the bulk of the gaseous refrigerant is compressed in the compressor 116 which has a relatively low compression ratio. A second heat exchanger 118 is evaporating following expansion at the expansion valve 120 and the gaseous compression refrigerant is further cooled, with some additional portion of is being condensed and collected in the chamber 122. The remainder of the gaseous compression circuit refrigerant is routed to the compressor 124 which compresses and heats the refrigerant, and from which it is routed to the compression circuit high pressure condenser 126. The compression circuit refrigerant, which may be Freon or ammonia, for examples, is then collected in the receiving tank 128. The conduit 130 from the receiver tank 128 completes the compression circuit path to the expansion valve 102. Incidentally, the pump 132 and the pump 134 serve to route the liquid refrigerant collected in tanks 114 and 122, respectively, to the conduit 130 which is already carrying liquid refrigerant.

Incidentally, the compression circuit may be implemented without the use of the compressor 124, with a slight reduction in efficiency, but at lower capital outlay.

Turning now to the compression circuit, we have noted the container 110 containing the liquid absorption circuit refrigerant, which will usually be ammonia. The absorption circuit condenser 134 is normally cooled by water, where available, or otherwise by air, as discussed hereinabove for the unit 72 in the system of FIG. 1. A small portion of the ammonia is fed back to the fractionating column 136 from the reflux surge drum 138, with the recirculation being accomplished by the reflux pump 140. Associated with the fractionating column 136 are the two reboilers 142 and 144 which receive heat from the prime mover 146 as described hereinabove relative to the engine 12 of FIG. 1.

Turning now to the absorption refrigeration circuit, the output from unit 108 mentioned above, is gaseous ammonia, and this output is routed to the low temperature absorber 152 along the line 154 from the condenser-/evaporator unit 108; and to the minimum temperature absorber 156 along line 158 from the condenser-/evaporator 118. Following absorption of the gaseous ammonia by the water and the resultant significant increase in the temperature of the solution, the highly concentrated ammonia-water solutions are routed to the evaporative coolers 158 and 160 by the pumps 162 and 164, respectively. Following cooling in the evaporative coolers 158 and 160, the liquid is recirculated to the absorbers 152 and 156 to maintain the temperature of the absorbers at a reasonable level. Below the absorbers 152 and 156 are the surge tanks 172 and 174, and the associated motors 176 and 178, respectively. Now, the strong aqua from the surge tanks 174 and 176 are routed on lines 180 and 182 to the heat exchangers 184 and 186. The other input to these two heat exchangers is the hot water from the fractionating column 136 where the ammonia has been removed from the "strong aqua". In the heat exchangers 184 and 186 the water, or "weak aqua" is cooled, and the "strong aqua", or concentrated ammonia-water solution, is heated, preparatory to application to the fractionating column where the solution must be very hot in order for the ammonia to be taken off from the water. The line 188 couples the water from the heat exchanger 184 to the absorber units.

Incidentally, some of the additional features shown in FIG. 1 may also be included in the system of FIG. 2. Thus, for example, a heat exchanger such as the unit 30 shown in FIG. 1, wherein the "strong aqua" is heated and the Freon or other compression refrigerant is cooled, could also be used in the system of FIG. 2. Similarly, supplemental electrical heating as indicated at 66, 68 in FIG. 1, could also be used in connection with the reboilers and fractionating column of FIG. 2.

FIGS. 3, 4 and 5 show external views of one illustrative embodiment of a retrofit installation. In FIG. 3, the unit 202 may be approximately 8 feet tall, 9 feet long, and 4 feet in depth to accommodate a unit providing approximately 20 tons of refrigeration, and 70 kilowatts of electrical output. The unit 202 may have a digital display 204, and may have a fan 206 at the top, and louvers 208 on the side to provide air circulation for cooling.

Figure 6:
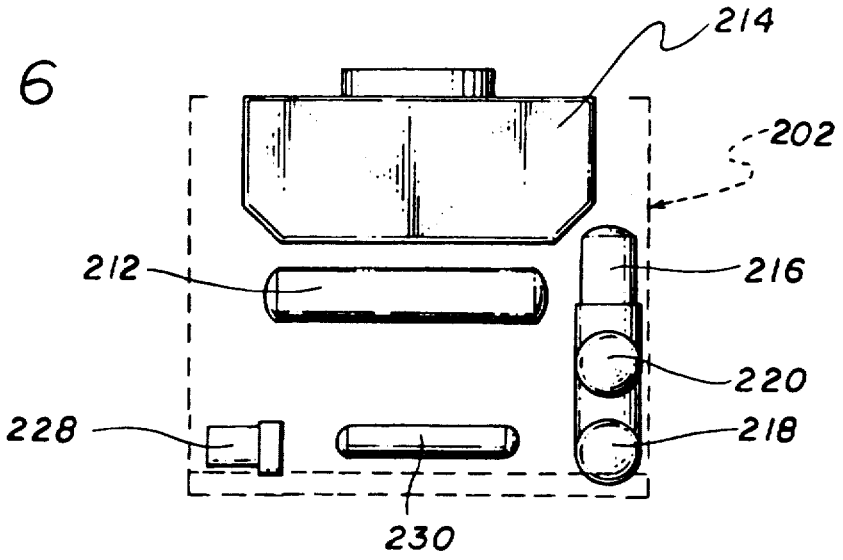
FIGS. 6, 7 and 8 are diagrammatic showings indicating the arrangement of the major components of the retrofit installation as shown in FIGS. 3 through 5.
Figure 7:
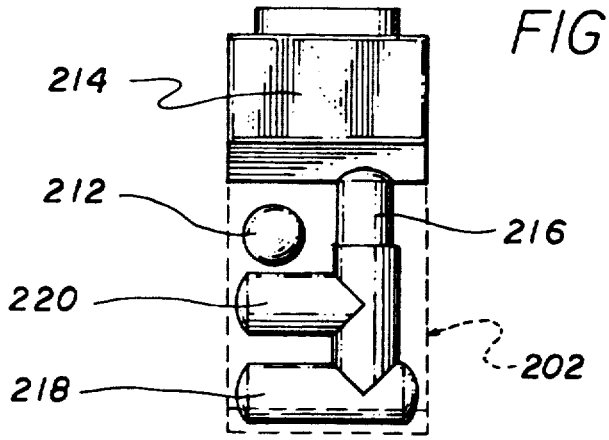
Figure 8:
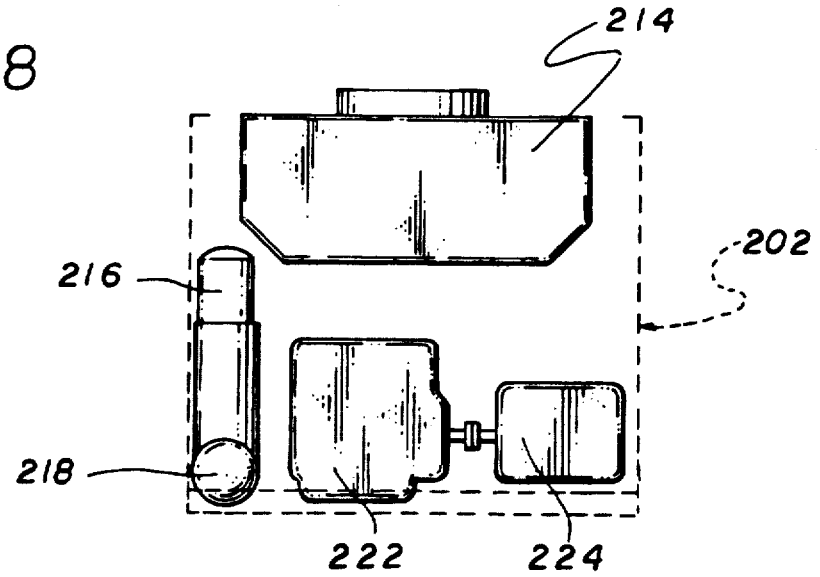

FIGS. 6, 7 and 8 indicate schematically the location of units within the housing 202 of FIGS. 3, 4 and 5. In FIGS. 6, 7, and 8, the combined evaporator for the absorption circuit and the condenser for the compression circuit is shown at reference numeral 212. The condenser and the absorber for the absorption circuit are shown as a single large unit 214 toward the top of the assemblage. The fractionating column 216 and the first and second reboilers 218 and 220 are located at one end of the unit, and the engine 222 and electric generator 224 are located along the back of the unit near the base thereof. The "strong aqua" pump, or the pump for the concentrated solution of water and ammonia is shown at reference numeral 228 adjacent the base of the unit. One or more heat exchangers may be located at reference numeral 230 as indicated in FIG. 6 of the drawings. In view of the fact that the installation as shown in FIGS. 3 through 8 is intended for retrofit installations, no compression circuit compressor is shown in this unit.

Incidentally, the units included in the present disclosure and particularly in the drawings, have been shown schematically, as virtually all of these are well-known, per se. Manufacturers who produce components as noted hereinbelow, are listed in the following table:

Compressors: Vilter Manufacturing Corp. Milwaukee, Wis.

Condensers and evaporative coolers: Baltimore Air Coil Company, Inc. Baltimore, Md.

Heat exchangers, Reboilers, and Surge tanks: Thermal Finned Processors, Los Angeles, Calif.

Fractionating columns, Absorbers, and Reboilers: Kotch Engineering Co., Inc. Witchita, Kans.

Evaporators: Krack Corp., Addison, Ill.

Pumps: Viking Pump Division, Houdaille Industries, Inc., Cedar Falls, Iowa.

Engine-generators: Waukesha Power Systems, Waukesha, Wis.

Incidentally, the motor generator may be either a stand-alone unit, or it may be coupled to the local utility electric power net. In the latter event, the motor generator is operated synchronously with the alternating current of the local utility, and the owner of the refrigeration system installation is given credit on his utility bill for electricity supplied to the local electrical net.

Concerning refrigerants, ammonia is the preferred absorption circuit refrigerant, used with water as the absorbent, and ammonia could also be used as the compression circuit refrigerant. The absorption system could also use water as the refrigerant and lithium bromide as the absorbent. Various refrigerants are available under the tradename Freon, and they may be used as the compression refrigerant. Freon is a halocarbon, and is relatively stable, and non-toxic, so it is often used in preference to ammonia for nonindustrial refrigeration applications. Halocarbon refrigerants, similar to Freon are also available under other trade names.

In conclusion, it is to be understood that the foregoing description relates to preferred embodiments illustrating the principles of the invention. Various changes and modifications may be made without departing from the spirit and scope of the invention. Thus, although the invention has been described primarily on the basis of using Freon as the compressible refrigerant and ammonia as the absorbent refrigerant, other refrigerants known in the art may be employed both for the compression circuit and also for the absorbent circuit. In addition, other known types of components may be employed to implement the various components of the system. Thus, instead of the fractionating column and reboilers, various forms of stills may be used. In addition, staging may be employed to increase efficiency, at slightly increased capital cost, with the use of two or three stages for the various refrigeration steps serving to increase efficiency but at slightly increased cost. Concerning another point, heat from the engine lubricating oil may be used for pre-heating the strong aqua, or for other heating purposes in the system or adjacent facilities. Similarly, radiated heat from the engine may be recovered by a suitable heat exchange method in cooperation with the engine enclosure, or the unit enclosure as shown in FIGS. 3-8. Accordingly, the present invention is not limited to the arrangements precisely as shown in the drawings, and described in the detailed description.

What is claimed is:

1. A high efficiency cascade refrigeration system comprising:

an absorption refrigeration circuit, said absorption circuit including means for separating the absorption circuit refrigerant from the absorbent;

a compression refrigeration circuit, said compression circuit including a compressor;

engine means for generating electricity, said engine generating heat;

means for supplying heat from said engine to said absorption circuit separating means;

means for cooling and condensing the refrigerant used in said compression circuit by the evaporation of the refrigerant in said absorption circuit; and means for powering said compressor from electricity generated by said engine means;

whereby a fully integrated, self-modulating system is provided, wherein increased cooling demand causes increased electrical load for the compressor and associated equipment, and correspondingly increased engine power and heat, boosting the absorption circuit capacity, thereby reducing compression ratio in the compression circuit, and system efficiency is increased.

2. A system as defined in claim 1 wherein ammonia is employed as the refrigerant in the absorption circuit.

3. A system as defined in claim 1 wherein the compression circuit refrigerant is ammonia.

4. A system as defined in claim 1 wherein the refrigerant in the compression circuit is Freon.

5. A system as defined in claim 1 wherein heat exchanger means are provided for concurrently cooling the gaseous compression circuit refrigerant and heating the liquid solution including the absorption circuit refrigerant.

6. A system as defined in claim 1 further including means for electrically heating the means for separating the absorption circuit refrigerant and absorbent.

7. A system as defined in claim 1 wherein said compression circuit includes a multistage compression circuit.

8. A system as defined in claim 1 further comprising condenser means for operating said compression circuit independent of said absorption circuit, and means for switching from cascade operation wherein said absorption circuit is operative, to a simple compression circuit mode of operation.

9. A system as defined in claim 1 wherein said engine has a hot gas exhaust and heated liquid coolant, and wherein means are provided for heating the absorption circuit separating means from both said hot gas exhaust and said heated liquid coolant.

10. A high efficiency cascade refrigeration system comprising:

an absorption refrigeration circuit, said absorption circuit including means for separating the absorption circuit refrigerant from the absorbent, and including ammonia as the refrigerant;

a compression refrigeration circuit, said compression circuit including a compressor, and including a halocarbon such as Freon as the refrigerant;

engine means for generating electricity, said engine generating heat;

means for supplying heat from said engine to said absorption circuit separating means; and means for cooling and condensing the refrigerant used in said compression circuit by the evaporation of the refrigerant in said absorption circuit; and means for powering said compressor from electricity generated by said engine means;

whereby a fully integrated, self modulating system is provided, wherein increased cooling demand causes increased electrical load for the compressor and associated equipment, and correspondingly increased engine power and heat, boosting absorption circuit capacity, thereby reducing the compression ratio in the compression circuit, and system efficiency is increased.

11. A system as defined in claim 10 wherein heat exchanger means are provided for concurrently cooling the gaseous compression circuit refrigerant and heating the liquid solution including the absorption circuit refrigerant.

12. A system as defined in claim 10 further including means for electrically heating the means for separating the absorption circuit refrigerant and absorbent.

13. A system as defined in claim 10 wherein said engine has a hot gas exhaust and heated liquid coolant, and wherein means are provided for heating the absorption circuit separating means from both said hot gas exhaust and said heated liquid coolant.

14. A high efficiency cascade refrigeration system comprising:

an absorption refrigeration circuit, said absorption circuit including means for separating the absorption circuit refrigerant from the absorbent;

a compression refrigeration circuit, said compression circuit including a compressor;

prime power source means including an engine for generating electricity, said engine generating heat in the form of hot exhaust gases and a heated coolant;

means for supplying heat from said hot exhaust gases and said heated coolant to said absorption circuit separating means;

means for cooling and condensing the refrigerant used in said compression circuit by the evaporation of the refrigerant in said absorption circuit; and means for supplying electricity from said generator to power compressors and pumps in said absorption and compression refrigeration circuits;

whereby a fully integrated self-modulating system is provided, wherein increased cooling demand causes increased engine power and heat, boosting absorption circuit capacity, thereby reducing the compression ratio in compression circuit, and system efficiency is increased.

15. A system as defined in claim 14 wherein ammonia is employed as the refrigerant in the absorption circuit.

16. A system as defined in claim 14 wherein heat exchanger means are provided for concurrently cooling the gaseous compression circuit refrigerant and heating the liquid solution including the absorption circuit refrigerant.

17. A system as defined in claim 1 further comprising condenser means for operating said compression circuit independent of said absorption circuit, and means for switching from cascade operation wherein said absorption circuit is operative, to a simple compression circuit mode of operation.

18. A system as defined in claim 1 further comprising means for supplying electricity from the generator to circuits other than said refrigeration circuits.

19. A high efficiency cascade refrigeration system comprising:

an absorption refrigeration circuit, said absorption circuit including means for separating the absorption circuit refrigerant from the absorbent;

a compression refrigeration circuit, said compression circuit including a compressor;

engine means for generating electricity, said engine generating heat;

means for supplying heat from said engine to said absorption circuit separating means;

means for cooling said condensing the refrigerant used in said compression circuit by the evaporation of the refrigerant in said absorption circuit;

said engine having a hot gas exhaust and heated liquid coolant, and wherein means are provided for heating the absorption circuit separating means from both said hot gas exhaust and said heated liquid coolent; and said separating means including a fractionating column, and first and second associated reboilers, with the gas exhaust being coupled to a first one of said reboilers, and said liquid coolant being coupled to said second reboiler;

whereby a fully integrated, self-modulating system is provided, wherein increased cooling demand causes increased engine power and heat, boosting the absorption circuit capacity, thereby reducing compression ratio in the compression circuit, and system efficiency is increased.

20. A high efficiency cascade refrigeration system comprising:

an absorption refrigeration circuit, said absorption circuit including means for separating the absorption circuit refrigerant from the absorbent, and including ammonia as the refrigerant;

a compression refrigeration circuit, said compression circuit including a compressor, and including a halocarbon such as Freon as the refrigerant;

engine means for generating electricity, said engine generating heat;

means for supplying heat from said engine to said absorption circuit separating means;

means for cooling and condensing the refrigerant used in said compression circuit by the evaporation of the refrigerant in said absorption circuit;

said engine having a hot gas exhaust and heated liquid coolant, and wherein means are provided for heating the absorption circuit separating means from both said hot gas exhaust and said heated liquid coolant; and said separating means including a fractionating column and first and second associated reboilers, with the gas exhaust being coupled to a first one of said reboilers, and said liquid coolant being coupled to said second reboilers;

whereby a fully integrated, self-modulating system is provided, wherein increased cooling demand causes increased electrical load for the compressor and associated equipment, and correspondingly increased engine power and heat, boosting absorption circuit capacity, thereby reducing the compression ratio in the compression circuit, and system efficiency is increased.

21. A high efficiency retrofit cascade refrigeration system comprising:

an absorption refrigeration circuit, said absorption circuit including means for separating the absorption circuit refrigerant from the absorbent;

a compression refrigeration circuit, said compression circuit including a compressor;

engine means for generating electricity, said engine generating heat;

means for supplying heat from said engine to said absorption circuit separating means;

means for cooling and condensing the refrigerant used in said compression circuit by the evaporation of the refrigerant in said absorption circuit;

means for powering said compressor from electricity generated by said engine means; and means for mounting said absorption refrigeration circuit, said engine means, said heat supplying means, and said cooling and condensing means, as a single separate, physical assembly, for use in a retrofit installation with an existing compression refrigeration system;

whereby a fully integrated, self-modulating system is provided, wherein increased cooling demand causes increased electrical load for the compressor and associated equipment, and correspondingly increased engine power and heat, boosting the absorption circuit capacity, thereby reducing compression ratio in the compression circuit, and system efficiency is increased.

*22. A high efficiency cascade refrigeration system comprising:*

*an absorption refrigeration circuit, said absorption circuit including means for separating the absorption circuit refrigerant from the absorbent;*

*a compression refrigeration circuit, said compression circuit including a compressor;*

*means for generating electricity and further for generating heat wherein increased generation of electricity results in increased generation of heat;*

*means for supplying said heat to said absorption circuit separating means;*

*means for cooling and condensing the refrigerant used in said compression circuit by the evaporation of the refrigerant in said absorption circuit; and*

*means for powering said compressor from said electricity;*

*whereby a fully integrated, self modulating system is provided, wherein an increased cooling demand causes increased electrical load for the compressor and associated equipment, and correspondingly increased heat to be generated, boosting the absorption circuit capacity, thereby reducing compression ratio in the compression circuit, and system efficiency is increased.*

*23. A system as defined in claim 22 wherein said electricity and heat generating means involves a chemical reaction, and in which the heat of reaction increases with increased electricity developed.*

*24. A system as defined in claim 22 wherein said electricity and heat generating means includes:*

*a natural gas turbine engine which develops the heat; and*

*an electrical generator driven by said turbine to develop said electricity.*

*25. A system as defined in claim 22 wherein said separating means includes:*

*a plurality of reboilers, said reboilers being heated by said heat, said reboilers heating said absorption circuit refrigerant and the absorbent; and*

*a fractionating column in which said absorption circuit refrigerant is separated from the absorbent.*

*26. A system as defined in claim 22 further comprising circuit means for selectively powering said compressor from electricity from one of said electricity and heat generating means and an electric local power net.*

*27. A system as defined in claim 26 wherein said circuit means further supplies excess electricity generated by said electricity and heat generating means to said local power net.*

*28. A system as defined in claim 22 including electrical circuit means coupled to said means for generating electricity, said electrical circuit means including an electric local power net; and*

*means for coupling said compressor to said electrical circuit means.*

*29. A system as defined in claim 22 wherein heat exchanger means are provided for concurrently cooling the gaseous compression circuit refrigerant and heating the liquid solution including the absorption circuit refrigerant.*

*30. A high efficiency cascade refrigeration system comprising:*

*an absorption refrigeration circuit, said absorption circuit including means for separating the absorption circuit refrigerant from the absorbent;*

*a compression refrigeration circuit, said compression circuit including a compressor;*

*prime power source means for generating electricity and concurrently generating heat wherein increased generation of electricity results in increased generation of heat;*

*means for supplying said heat to said absorption circuit separation means;*

*means for cooling and condensing the refrigerant used in said compression circuit by the evaporation of the refrigerant in said absorption circuit; and*

*means for powering said compressor from electricity;*

*whereby a fully integrated, self modulating system is provided, wherein an increased cooling demand causes increased electrical load for the compressor and associated equipment, and correspondingly increased heat to be generated, boosting the absorption circuit capacity, thereby reducing compression ratio in the compression circuit, and system efficiency is increased.*

*31. A high efficiency cascade refrigeration system comprising:*

*an absorption refrigeration circuit, said absorption circuit including means for separating the absorption circuit refrigerant from the absorbent;*

*a compression refrigeration circuit, said compression circuit including a compressor;*

*means for generating electricity and further for generating heat wherein increased generation of electricity results in increased generation of heat;*

*means for supplying said heat to said absorption circuit separating means;*

*means for cooling and condensing the refrigerant used in said compression circuit by the evaporation of the refrigerant in said absorption circuit;*

*electric circuit means coupled to said means for generating electricity; and*

*means for coupling said compressor to said electric circuit means;*

*whereby a fully integrated, self-modulating system is provided, wherein an increased cooling demand causes increased electrical load for the compressor and associated equipment, and correspondingly increased heat to be generated, boosting the absorption circuit capacity, thereby reducing compression ratio in the compression circuit, and system efficiency is increased.*

*32. A system as defined in claim 30 wherein said electric circuit means includes a local electric utility network.*

* * * * *